US009479525B2

(12) United States Patent
Borlick et al.

(10) Patent No.: US 9,479,525 B2
(45) Date of Patent: Oct. 25, 2016

(54) INTERACTING WITH A REMOTE SERVER OVER A NETWORK TO DETERMINE WHETHER TO ALLOW DATA EXCHANGE WITH A RESOURCE AT THE REMOTE SERVER

(71) Applicant: INTERNATIONAL BUSINESS MACHINES CORPORATION, Armonk, NY (US)

(72) Inventors: Matthew G. Borlick, Tucson, AZ (US); Roger G. Hathorn, Tucson, AZ (US); Steven E. Klein, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 14/522,245

(22) Filed: Oct. 23, 2014

(65) Prior Publication Data

US 2016/0119372 A1    Apr. 28, 2016

(51) Int. Cl.
*H04L 29/06*    (2006.01)
*G06F 21/57*    (2013.01)

(52) U.S. Cl.
CPC ......... *H04L 63/1433* (2013.01); *G06F 21/577* (2013.01); *H04L 63/1441* (2013.01); *H04L 63/20* (2013.01); *G06F 2221/034* (2013.01)

(58) Field of Classification Search
CPC ........... H04L 63/1433; H04L 63/1441; H04L 63/20; G06F 21/577; G06F 2221/034
See application file for complete search history.

(56) References Cited

U.S. PATENT DOCUMENTS

| 8,589,671 | B2 | 11/2013 | Schneider | |
|---|---|---|---|---|
| 2001/0034847 | A1* | 10/2001 | Gaul, Jr. | H04L 63/1433 726/25 |
| 2002/0010855 | A1* | 1/2002 | Reshef | G06F 21/554 713/164 |

(Continued)

FOREIGN PATENT DOCUMENTS

WO    2005091107    9/2005

OTHER PUBLICATIONS

Campo-Giralte et al., ("PolyVaccine: Protecting Web Servers against Zero-Day, Polymorphic and Metamorphic Exploits", Sep. 2009, 28th IEEE International Symposium on Reliable Distributed Systems, pp. 91-99.*

(Continued)

*Primary Examiner* — Kenneth Chang
(74) *Attorney, Agent, or Firm* — David W. Victor; Konrad Raynes Davda & Victor LLP

(57) ABSTRACT

Provided are a computer program product, system, and method for interacting with a remote server over a network to determine whether to allow data exchange with a resource at the remote server. Detection is made of an attempt to exchange data with the remote resource over the network. At least one computer instruction is executed to perform at least one interaction with the server over the network to request requested server information for each of the at least one interaction. At least one instance of received server information is received. A determination is made whether the at least one instance of the received server information satisfies at least one security requirement. A determination is made of whether to prevent the exchanging of data with the remote resource based on whether the at least one instance of the received server information satisfies the at least one security requirement.

28 Claims, 5 Drawing Sheets

(56) References Cited

U.S. PATENT DOCUMENTS

| | | | |
|---|---|---|---|
| 2002/0066034 A1* | 5/2002 | Schlossberg | G06Q 30/0277 726/4 |
| 2003/0188194 A1* | 10/2003 | Currie | G06Q 30/0601 726/22 |
| 2006/0048017 A1* | 3/2006 | Anerousis | G06F 11/1438 714/47.2 |
| 2006/0048214 A1* | 3/2006 | Pennington | H04L 63/168 726/5 |
| 2008/0040174 A1* | 2/2008 | Murthy | G06Q 30/06 709/224 |
| 2010/0223456 A1 | 9/2010 | Schneider | |
| 2011/0258479 A1* | 10/2011 | Hanna | G06F 21/577 714/1 |
| 2012/0303808 A1* | 11/2012 | Xie | H04L 61/1511 709/225 |
| 2013/0247204 A1* | 9/2013 | Schrecker | H04L 45/306 726/25 |
| 2014/0137190 A1* | 5/2014 | Carey | H04L 63/1433 726/3 |

OTHER PUBLICATIONS

A. Barth, et al., "Secure Content Sniffing for Web Browsers, or How to Stop Papers from Reviewing Themselves", Google, 2009, pp. 12.

A. Barua, et al., "Server Side Detection of Content Sniffing Attacks", 2011 22nd IEEE International Symposium on Software Reliability Engineering, IEEE, 2011, AN-12490635, pp. 10.

"Heartbleed", Wikipedia, [online][retrieved Sep. 29, 2014] http://en.wikipedia/org/wiki/heartbeed, pp. 22.

* cited by examiner

INTERACTING WITH A REMOTE SERVER OVER A NETWORK TO DETERMINE WHETHER TO ALLOW DATA EXCHANGE WITH A RESOURCE AT THE REMOTE SERVER

BACKGROUND OF THE INVENTION

1. Field of the Invention

The present invention relates to a computer program product, system, and method for interacting with a remote server over a network to determine whether to allow data exchange with a resource at the remote server.

2. Description of the Related Art

Computer users do not know whether a web site they are connecting to is exposed to a known security vulnerability issue. For instance, the security bug known as Heartbleed (CVE-2014-0160) operates by exploiting a known security vulnerability by requesting an excessive amount of data to cause the server to return recent data in memory which may include passwords, usernames and other sensitive information. To avoid the Heartbleed vulnerability after detected, users had to resort to manual checking or verification of the remote web site.

Another recently discovered vulnerability is known as Shellshock (CVE-2014-6271), which is a vulnerability that has existed since 1992 in Bash, a program that Unix based systems use to execute command lines and command scripts. The vulnerability exists in that web based requests and commands can invoke calls to Bash that allow exploitation of vulnerabilities. To probe if a remote system is exposed to Shellshock, a test may be performed to attempt to extend an innocuous command, such as echo, beyond a bash variable setting, and check if the command executes. If it does, the system is exposed to the Shellshock vulnerability.

There is a need in the art for improved techniques for detecting security vulnerabilities with servers and code to protect web users.

SUMMARY

Provided are a computer program product, system, and method for interacting with a remote server over a network to determine whether to allow data exchange with a resource at the remote server. Detection is made of an attempt to exchange data with the remote resource over the network. At least one computer instruction is executed to perform at least one interaction with the server over the network to request requested server information for each of the at least one interaction. At least one instance of received server information is received in response to each of the at least one interaction for the requested server information. A determination is made from the at least one instance of the received server information whether the at least one instance of the received server information satisfies at least one security requirement. A determination is made of whether to prevent the exchanging of data with the remote resource based on whether the at least one instance of the received server information satisfies the at least one security requirement.

DETAILED DESCRIPTION

Described embodiments provide techniques for determining whether to allow a user to exchange data with a resource at a remote server when the user is detected attempting to access the resource. Described embodiments determine computer instructions to execute to interact with the remote server to determine whether received server information resulting from the interaction satisfies one or more security requirements. Failure of the received server information to satisfy the security requirements indicates that the remote server may be vulnerable to a known security exposure, and that any exchange of information, e.g., user login attempt, user ID, password exchange, key exchange, sending of sensitive data, etc., should be prevented to avoid exposure to the security risk due to the presence of the known vulnerability.

Figure 1:
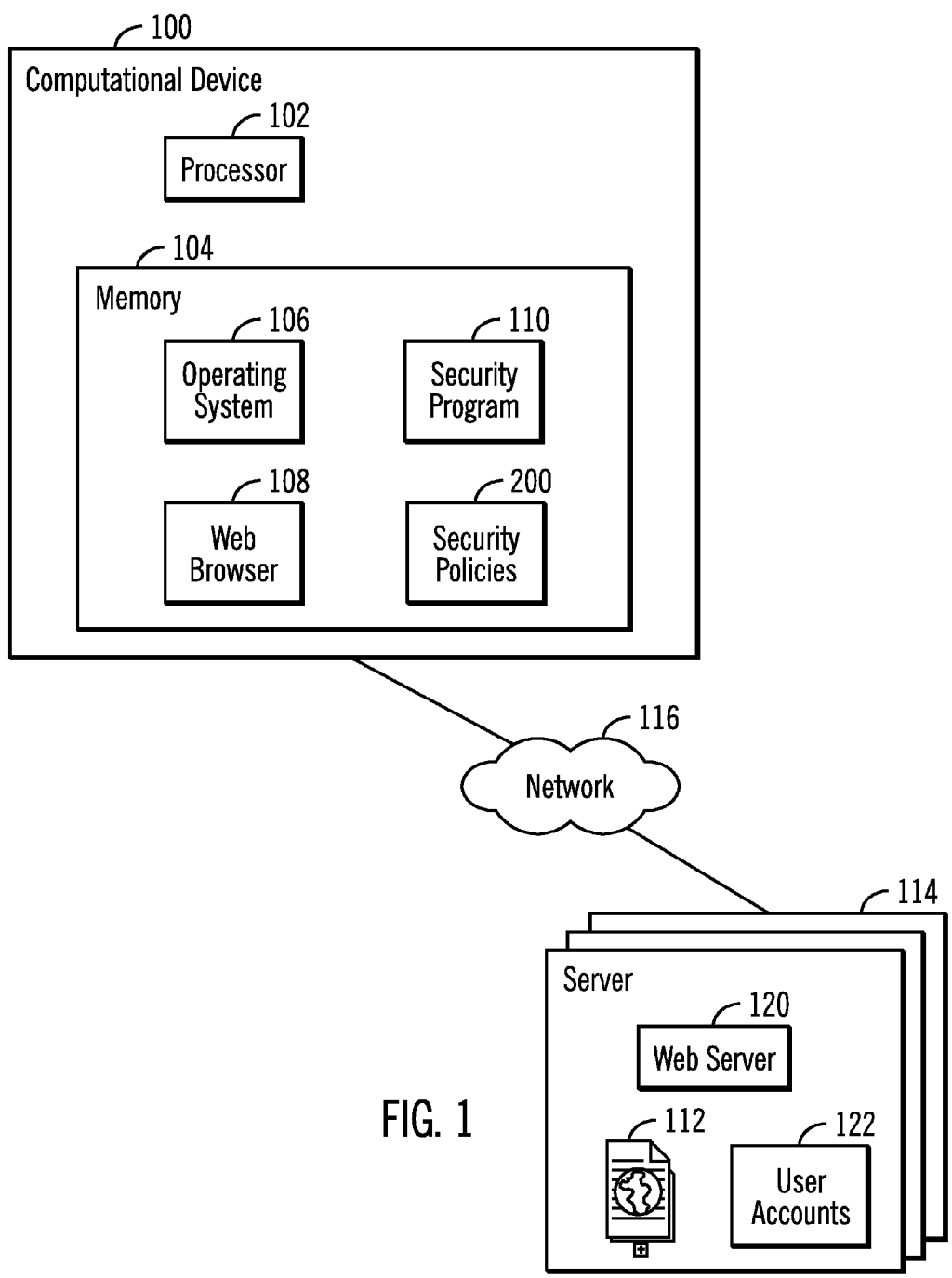
FIG. 1 illustrates an embodiment of a network computing environment.

FIG. 1 illustrates a computational environment having a computational device 100 including a processor 102, comprising one or more processing devices, and a memory 104 having various programs such as an operating system 106, web browser 108, and a security program 110 to determine whether to allow the user to exchange data with the remote server 114, such as login to an account 122 accessible through a web page 112 being accessed from the remote server 114 over a network 116 through the web browser 108. The security program 110 maintains security policies 200 used to determine whether to allow the user to exchange data with the web page 112 being accessed. There may be multiple servers 114 with which the computational device 100 communicates.

The computational device 100 communicates with the server 114 over the network 116. The server 114 includes a web server 120, such as a Hypertext Transport Protocol (HTTP) server, to provide access to web pages 112 maintained at the server 114 and user accounts 122 having user information and authentication and login information for users that login in through a web page 112.

In one embodiment, the security program 110 may comprise a plug-in application of the web browser 108 or may be part of a computer protection program, such as a program that reports or blocks access to unsafe web sites, such as a firewall product, anti-virus program.

The computational device 100 may comprise a laptop, desktop, smartphone, tablet, smartcard, server, workstation, etc. The server 114 may comprise a server class machine. The network 116 may comprise a Wide Area Network (WAN), Local Area Network (LAN), Storage Area Network (SAN), the Internet, and Intranet, a wireless network, wired network, etc. The memory 104 may comprise one or more volatile or non-volatile memory devices.

In one embodiment, the resource, e.g., user account 122, with which the web browser 108 or other client program accesses may comprise a host server or storage server. In such case, the security program 110 interacts with a network interface to access the storage or host over the network 116. In embodiments where the network comprises a storage area network (SAN), then the network interface may comprise a SAN interface such as Fibre Channel, Fibre Channel over Ethernet (FCoE), Internet Small Computer System Interface (iSCSI), etc.

Figure 2:
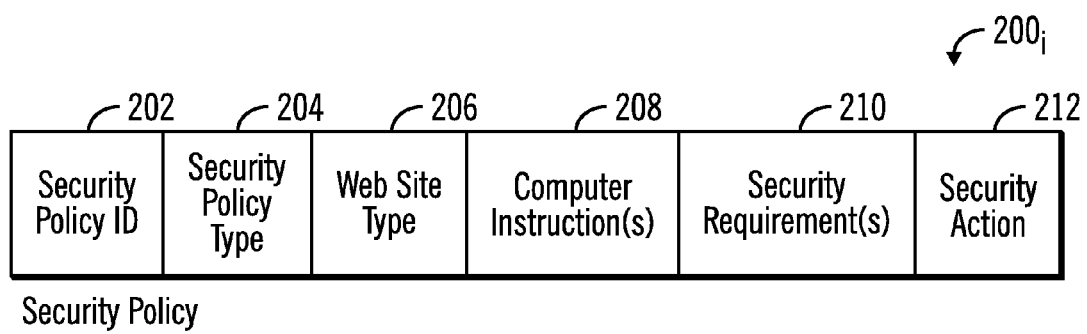
FIG. 2 illustrates an embodiment of a security policy.

FIG. 2 illustrates an instance of a security policy $200_i$ of the security policies 200, including a security policy identifier (ID) 202; a security policy type 204, which may indicate a type of security level, e.g., high, medium, low; a web site type 206 indicating a type of the web site for which the security policy 202 applies; one or more computer instructions 208 to perform one or more types of interactions with the server 114 being accessed to obtain one or more types of server information; a security requirement 210 for each of the one or more types of interactions indicating a requirement to compare with the returned server information returned in response to the interaction; and a security action 212 to perform depending on the one or more instances of returned server information satisfying one or more security requirements 210.

In certain embodiments, the computer instruction may request software levels of software at the server 114, such as the operating system level, communication protocol level, e.g., HTTP level, a secure communication layer protocol, e.g., Secure Shell (SSH), etc. For information requests for a software level, the security requirement 210 may indicate a current software level for the software to determine whether the remote server software level is at a current level or acceptable recent level. Failure for the remote server 114 to be at the current level may result in preventing the user from exchanging data with the web page 112 or other resource being accessed.

In a further embodiment, the computer instructions for one of the interaction types may simulate an attack to probe if the remote server 114 is susceptible to a known security vulnerability by determining whether expected data can be obtained from the server 114. The security requirement determines whether the received server information comprises the expected data that would be expected from exploitation of the security vulnerability, such a certain amount of requested data. In this way, the computer instruction may interact with the server 114 to determine whether the security program 110 was able to exploit a known vulnerability. The security action 212 may indicate to prevent the user from exchanging data, e.g., logging-in, sending personal information, etc., at the web page 112 if the sever 114 proved susceptible to the security vulnerability. For instance, the computer instructions 208 may request data beyond the length of a provided word, to determine if the server 114 is exposed to the Heartbleed vulnerability (CVE-2014-0160). If the response is the requested amount of data beyond the length of the requested word, then the security program 110 would have determined that the server is exposed to the vulnerability and a security risk.

The security policies 200 may indicate different computer instructions 208 to execute to interact with the server 114 in different ways. The security policies 200 may indicate computer instructions for different types of interactions to perform with respect to the server and multiple security requirements, one for each of the different types of interactions. Further, for at least one security policy 200, such as a lower security risk type of web site, such as a web site where the user accounts 122 do not contain personal financial information, the security action 212 may indicate to allow the user to access the user account 122 in response to determining that one of the at least one executed operation indicates that the server is exposed to the risk of attack. For a security policy $200_i$ for a web site 112 providing access to user accounts 112 having user personal financial information, the security action 212 may prevent the user from logging-in if any one of the security requirements 210 indicate the vulnerability was exploited or the software level is not current.

In a further embodiment, the security policies 200 may not indicate computer instructions, and the same computer instructions may be executed to perform the same interactions regardless of the security policy type 204, but the security policies 200 may have different security requirements 210 and security 212 actions for the same measured interactions.

Figure 3:
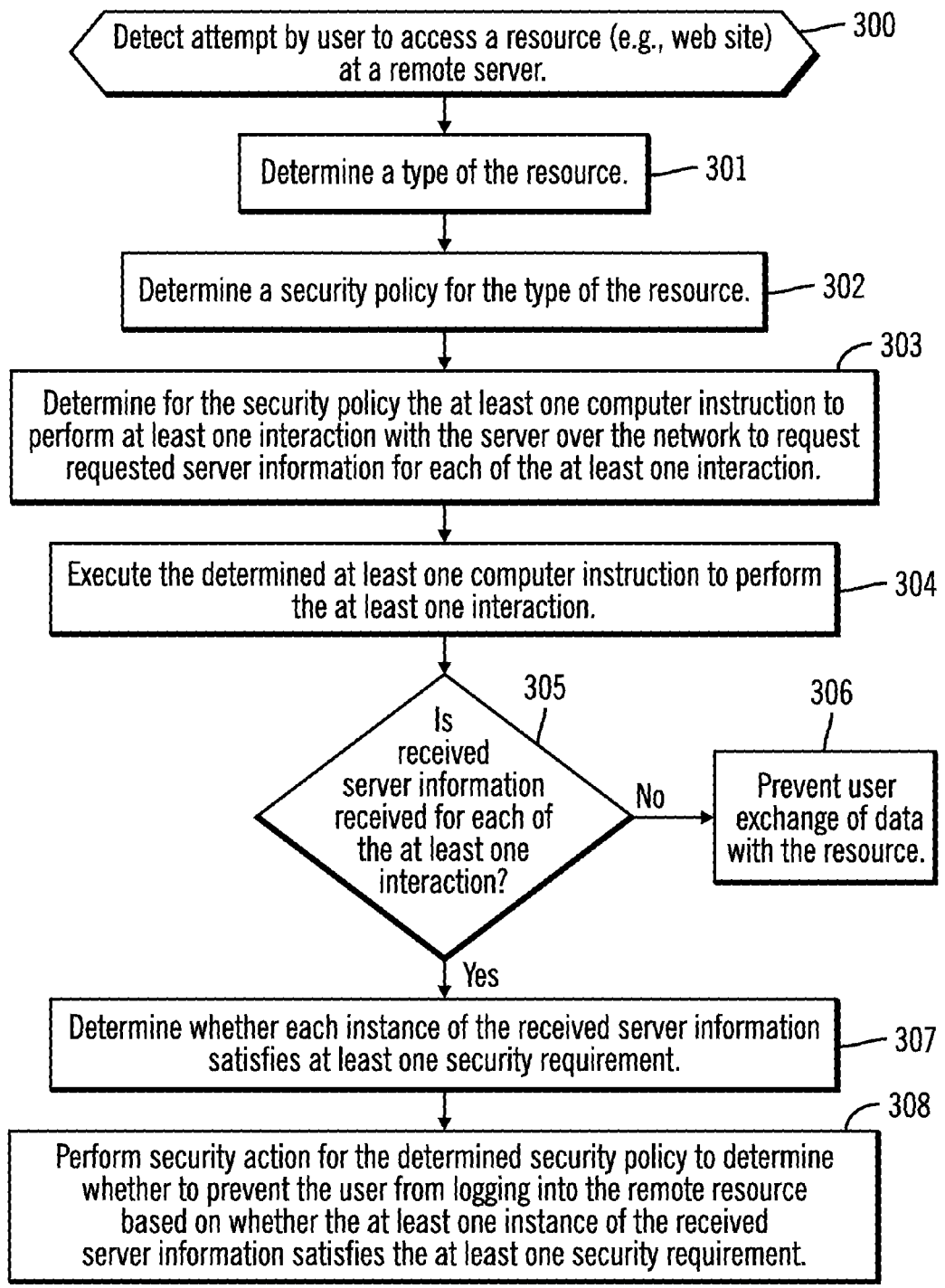
FIG. 3 illustrates an embodiment of operations to determine whether to allow a user to exchange data with a remote server.

FIG. 3 illustrates an embodiment of operations performed by the security program 110 to determine whether to access a resource at a remote server 114, e.g., allow a user to login at a web site 112 to access their user account 122. The resource to access may comprise a user account 122 accessible through a web site 112 or other type of account, database, etc., for remote access. Upon detecting (at block 300) a user to attempt to access a resource, such as a web site 112 to access the user account 112, the security program 110 determines (at block 301) a type of web site 112 or resource the user is trying to access. The type may be determined from a list of web sites and types for the web sites, or by querying the web site for information on the type or nature of the web site, and then determining based on the information the type of web site, i.e., whether it involves personal financial information. A security policy $200_i$ for the determined type 206 is determined (at block 302). A determination is made (at block 303) for the security policy $200_i$ of the at least one computer instruction 208 for at least one interaction with the server 114 over the network 116 to request requested server information, such as a software level or an amount of data to exploit a known security vulnerability, such as to simulate a malicious attack. The security program 110 executes (at block 304) the determined at least one computer instruction 208 to perform the at least one interaction with the server 114 at which the user is attempting to access the user account 122.

If (at block 305) the requested server information is not received for each of the interactions being performed, then the user is prevented (at block 306) from exchanging data and information with the web site 112, such as logging-in, registering, sending data, etc. If (at block 305) the user receives server information for each requested interaction, then the security policy 110 determines (at block 307) whether each instance of the received server information satisfies at least one security requirement 210 for the interaction. The security action 212 for the determined security policy $200_i$ is performed (at block 308) to determine whether to prevent or allow the user to login to the remote resource, e.g., user account 122 at the remote web site 112, based on whether the at least one instance of the received server information satisfies the at least one security requirement 210. For instance for a web site type 206 requiring a higher level of security, such as a web site providing access to personal account information, the user login may be blocked if any one of the security requirements are not met, such as those security requirements 210 concerning determining if there are vulnerabilities such that the remote server 114 and user accounts 122 would be vulnerable to a malicious attack to misappropriate sensitive user personal financial account information. However, for a web site having a user account that does not involve personal financial information, such as an entertainment web site, etc., the security action 212 may still allow the user to login to the user account 122 even if not all the received server information for different instances of computer instructions 208 satisfy the corresponding security requirements 210.

For instance, in one embodiment, a first security policy $200_1$ is associated with a first web site type 204 maintaining personal financial account information and a second security policy $200_2$ is associated with a second web site type for which personal financial account information is not provided. A first security action 212 associated with the first security policy $200_1$ and the first web site type specifies to prevent the user from exchanging data, e.g., logging-in, if one of the different tests performed with respect to the server indicates that the server is exposed to the risk. A second security action 212 associated with the second security policy $200_2$ and the second web site type specifies to allow the user to exchange data, e.g., login, if one of the different tests performed with respect to the server indicates that the server is exposed to the risk.

Figure 4:
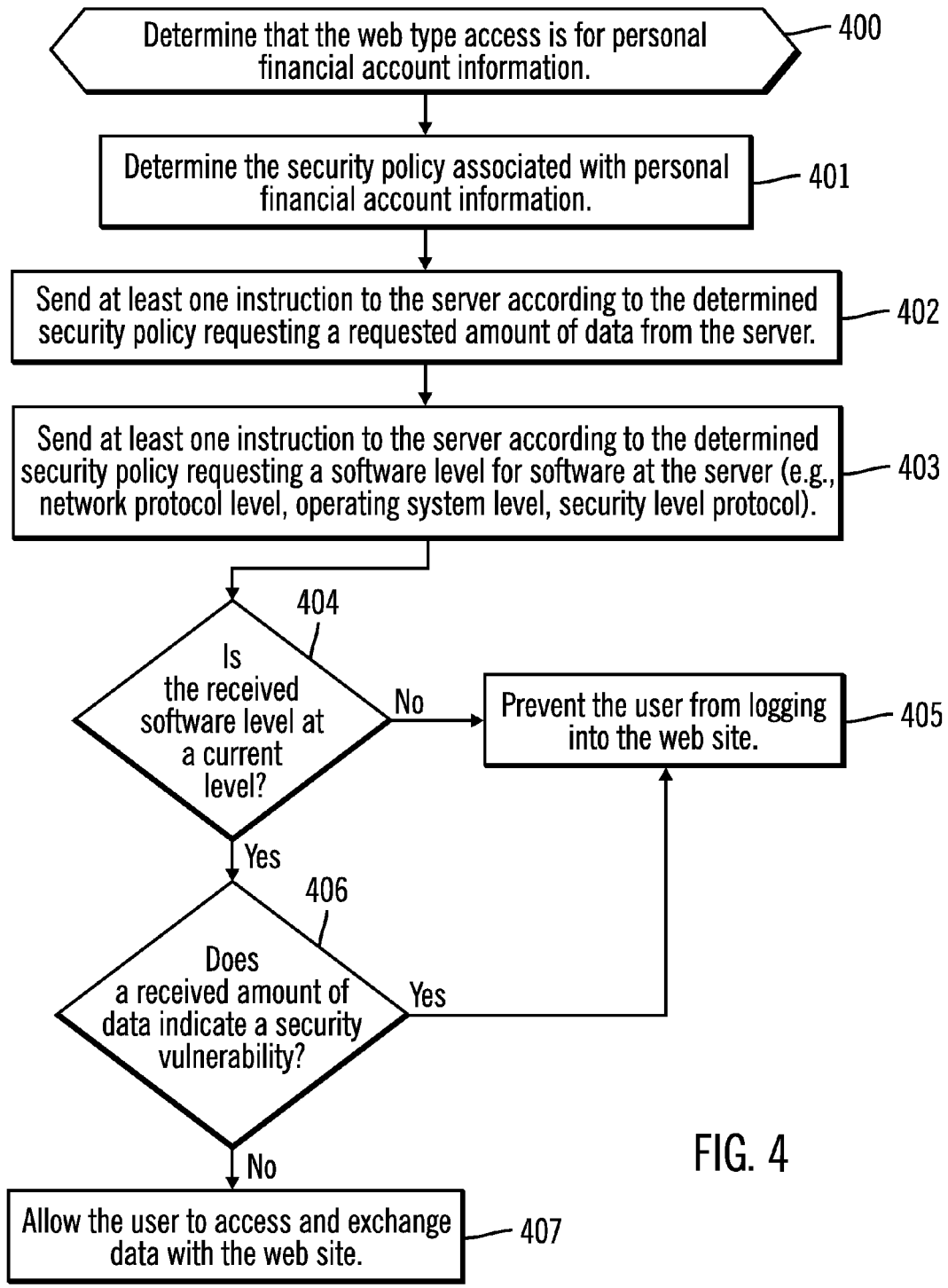
FIG. 4 illustrates an embodiment of operations to determine whether to allow a user to access an account at a remote web site having personal financial account information.

FIG. 4 illustrates an embodiment of operations performed by the security program 110 when the access is with respect to a user account 122 having personal financial account information. Upon detecting (at block 400) that the web site type 206 provides access to personal financial account information, the security program 110 determines (at block 401) the security policy $200_i$ associated with the personal financial account information web site type. The security program 110 sends (at block 402) at least one instruction 208 to the server 114 according to the determined security policy $200_i$ requesting a requested amount of data from the server 114. The security program 110 sends (at block 403) at least one computer instruction 208 to the server 114 according to the determined security policy $200_i$ requesting a software level for software at the server (e.g., network protocol level, operating system level, security level protocol). If (at block 404) the received software level is not a current level for the software, then the user is prevented (at block 405) from logging into their account 122 at the web site 112. If (at block 404) the received software level is at a current level, then the security program 110 determines (at block 406) whether a received amount of data in response to the instruction requesting an amount of data comprises the requested amount of data, which indicates the web site 112 is vulnerable to a malicious attack. If (at block 406) the received amount of data indicates exposure to one or more security vulnerabilities, then the user is prevented (at block 405) from accessing the user account 112 at the web site 112. If the received amount does not equal the requested amount, then the server 114 is preventing the security vulnerability, and the security program 110 allows (at block 407) the user to exchange data with the web site 112.

In certain embodiments, the computer instructions 208 and security requirements 210 may include determining whether the server 114 will return a requested amount of data similar to what a malicious attack would request, such as the case with a Heartbleed attack. In further embodiments, other tests of the server 114 may be performed to determine whether other security vulnerabilities are present. Further, the security policies 200 may be remotely updated with new computer instruction 208 to test web sites against different types of malicious attacks that seek to exploit security vulnerabilities in program code.

In described embodiments, the security program 110 may perform the checking whether the web site complies with the security requirements 210 whenever the user attempts to exchange data with the web site 112. In alternative embodiments, the security program 110 may save information on the results of the security requirement testing, and use to determine whether to allow or prevent access to the web site during subsequent accesses.

Certain of the computer instructions 208 may test security vulnerabilities by accessing data from the server 114. The security program 110 may immediately delete any data returned by the server 114 after the testing to avoid maintaining confidential information.

Described embodiments provide techniques for a security program that checks security vulnerabilities at a remote server which the user is trying to access and exchange data, such as at a remote web site, host or storage, by executing computer instructions to interact with the remote server to obtain server information and determine whether the received server information satisfies one or more security requirements. Failure to satisfy the security requirements indicates that the remote web site may be vulnerable to malicious attacks. A security action determines whether to allow the user to access an account at the remote web site to avoid the user personal information being exposed in an attack based on the nature of the web site.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), storage area network (SAN), or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
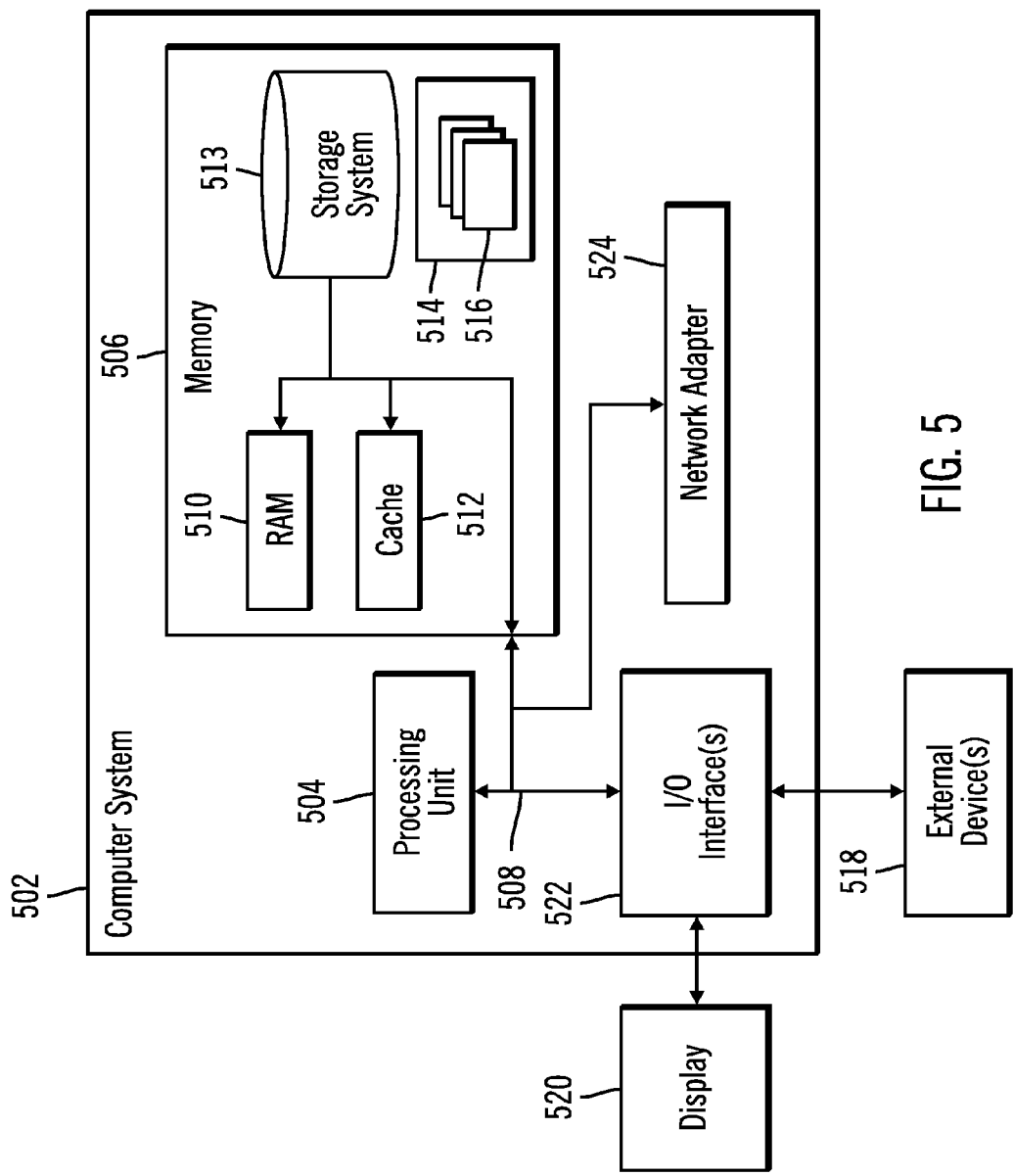
FIG. 5 illustrates an embodiment of a computer architecture used with described embodiments.

The computational device 100 and server 114, and components therein, may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular resources or implement particular abstract data types. Computer system/server 502 may be practiced in distributed cloud computing environments where resources are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 516 which generally carry out the functions and/or methodologies of embodiments of the invention as described herein.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a computational device access to a remote resource at a server over a network, the computer program product comprising a computer readable storage medium having computer readable program code embodied therein that executes in the computational device to perform operations, the operations comprising:

detecting an attempt by the computational device to exchange data with the remote resource over the network;

executing at least one computer instruction to perform at least one interaction by the computational device with the server over the network to request server information for each of the at least one interaction in response to detecting the attempt to exchange data with the remote resource, wherein one of the at least one interaction comprises exploiting a known security vulnerability by sending a request to obtain expected data from the server;

receiving server information in response to each of the at least one interaction with the server for the requested server information;

determining from the received server information whether the received server information satisfies at least one security requirement by at least determining whether the received server information comprises the expected data indicating the known security vulnerability; and determining whether to prevent the computational device from exchanging of data with the remote resource based on whether the received server information satisfies the at least one security requirement.

2. The computer program product of claim 1, wherein the requested server information further comprises a requested software level of software at the server, wherein the received server information comprises a received software level of the software at the server, wherein determining whether the received server information satisfies the security requirement comprises determining whether the received software level is at a current level for the software at the server, wherein the operations further comprise:

preventing a user from exchanging data with the remote resource in response to determining that the received software level at the server is not at the current level; and allowing the user to exchange data with the remote resource in response to determining that the received software level at the server is at the current level.

3. The computer program product of claim 2, wherein the requested software level comprises at least one of a network protocol level at the server, an operating system level at the server, and a security protocol level at the server.

4. The computer program product of claim 1, wherein the expected data comprises a requested amount of data from the server, wherein the received server information comprises a received amount of data, wherein determining whether the received server information satisfies the at least one security requirement comprises determining whether the received amount of data comprises the requested amount of data, and wherein the operations further comprise:

preventing a user from exchanging data with the remote resource in response to determining that the received amount of data comprises the requested amount of data; and allowing the user to exchange data with the remote resource in response to determining that the server did not return the requested amount of data.

5. The computer program product of claim 1, wherein the known security vulnerability comprises a security vulnerability of websites in an Internet.

6. The computer program product of claim 1, wherein the remote resource comprises a web site providing access to a user account, wherein the operations further comprise:

maintaining multiple security policies, wherein each security policy associates a web site type and a security action to perform, wherein the security action indicates to allow or deny a user to exchange data with the web site;

determining a web site type in response to detecting the attempt to exchange data with the web site; and performing the security action indicated in the security policy associated with the determined web site type to determine whether to allow the access to the user account based on whether the received server information satisfies the at least one security requirement.

7. The computer program product of claim 6, wherein the security policies each indicate the at least one computer instruction to execute, wherein at least two of the security policies indicate different computer instructions to execute to interact with the server.

8. The computer program product of claim 7, wherein the security policies indicate computer instructions for different types of interactions to perform with respect to the server and multiple security requirements, one for each of the different types of interactions.

9. The computer program product of claim 6, wherein for at least one security policy, the security action indicates to allow access to the user account in response to determining that one of the at least one interaction indicates that the server is exposed to a risk of attack.

10. The computer program product of claim 6, wherein a first security policy is associated with a first web site type maintaining personal financial account information and wherein a second security policy is associated with a second web site type for which personal financial account information is not provided, wherein the at least one computer instruction comprises multiple operations to perform different tests with respect to the server, wherein a first security action associated with the first web site type specifies to prevent logging-in if one of the different tests performed with respect to the server indicates that the server is exposed to a risk, and wherein a second security action associated with the second web site type specifies to allow exchanging of data with the server if one of the different tests performed with respect to the server indicates that the server is exposed to the risk.

11. The computer program product of claim 1, wherein the remote resource comprises a web site providing access to a user account, wherein the computer program product interacts with a web browser being used to login to the user account at the web site.

12. The computer program product of claim 1, wherein the remote resource comprises at least one of a host server and a storage server and wherein the computer program product interacts with a network interface to the at least one of the host server and the storage server through a network.

13. A system for managing access to a remote resource at a server over a network, comprising:
  a processor; and
  a computer readable storage medium having program code that when executed by the processor performs operations, the operations comprising:
    detecting an attempt by the system to exchange data with the remote resource over the network;
    executing at least one computer instruction to perform at least one interaction with the server over the network to request server information for each of the at least one interaction in response to detecting the attempt to exchange data with the remote resource, wherein one of the at least one interaction comprises exploiting a known security vulnerability by sending a request to obtain expected data from the server;
    receiving server information in response to each of the at least one interaction with the server for the requested server information;
    determining from the received server information whether the received server information satisfies at least one security requirement by at least determining whether the received server information comprises the expected data indicating the known security vulnerability; and
    determining whether to prevent the system from exchanging of data with the remote resource based on whether the received server information satisfies the at least one security requirement.

14. The system of claim 13, wherein the at least one computer instruction comprises querying the server to determine a software level of software at the server, wherein the requested server information further comprises a requested software level, wherein the received server information comprises a received software level of the software at the server, wherein determining whether the received server information satisfies the security requirement comprises determining whether the received software level is at a current level for the software at the server, wherein the operations further comprise:
  preventing a user from exchanging data with the remote resource in response to determining that the received software level at the server is not at the current level; and
  allowing the user to exchange data with the remote resource in response to determining that the received software level at the server is at the current level.

15. The system of claim 13, wherein the expected data comprises a requested amount of data from the server, wherein the received server information comprises a received amount of data, wherein determining whether the received server information satisfies the security requirement comprises determining whether the received amount of data comprises the requested amount of data, and wherein the operations further comprise:
  preventing a user from exchanging data with the remote resource in response to determining that the received amount of data comprises the requested amount of data; and
  allowing the user to exchange data with the remote resource in response to determining that the server did not return the requested amount of data.

16. The system of claim 13, wherein the remote resource comprises a web site providing access to a user account, wherein the operations further comprise:
  maintaining multiple security policies, wherein each security policy associates a web site type and a security action to perform, wherein the security action indicates to allow or deny a user to exchange data with the web site;
  determining a web site type in response to detecting the attempt to exchange data with the web site; and
  performing the security action indicated in the security policy associated with the determined web site type to determine whether to allow the access to the user account based on whether the received server information satisfies the at least one security requirement.

17. The system of claim 16, wherein the security policies each indicate the at least one computer instruction to execute, wherein at least two of the security policies indicate different computer instructions to execute to interact with the server.

18. The system of claim 17, wherein the security policies indicate computer instructions for different types of interactions to perform with respect to the server and multiple security requirements, one for each of the different types of interactions.

19. The system of claim 16, wherein for at least one security policy, the security action indicates to allow access to the user account in response to determining that one of the at least one interaction indicates that the server is exposed to a risk of attack.

20. The system of claim 16, wherein a first security policy is associated with a first web site type maintaining personal financial account information and wherein a second security policy is associated with a second web site type for which personal financial account information is not provided, wherein the at least one computer instruction comprises multiple operations to perform different tests with respect to the server, wherein a first security action associated with the first web site type specifies to prevent logging-in if one of the different tests performed with respect to the server indicates that the server is exposed to a risk, and wherein a second security action associated with the second web site type specifies to allow exchanging of data with the server if one of the different tests performed with respect to the server indicates that the server is exposed to the risk.

21. A method for managing a computational device access to a remote resource at a server over a network, comprising:
  detecting an attempt by the computational device to exchange data with the remote resource over the network;
  executing at least one computer instruction to perform at least one interaction by the computational device with the server over the network to request server information for each of the at least one interaction in response to detecting the attempt to exchange data with the remote resource, wherein one of the at least one interaction comprises exploiting a known security vulnerability by sending a request to obtain expected data from the server;
  receiving server information in response to each of the at least one interaction with the server for the requested server information;
  determining from the received server information whether the received server information satisfies at least one security requirement by at least determining whether the received server information comprises the expected data indicating the known security vulnerability; and
  determining whether to prevent the computational device from exchanging of data with the remote resource based on whether the received server information satisfies the at least one security requirement.

22. The method of claim 21, wherein the requested server information comprises a requested software level of software at the server, wherein the received server information comprises a received software level of the software at the server, wherein determining whether the received server information satisfies the security requirement comprises determining whether the received software level is at a current level for the software at the server, further comprising:
  preventing a user from exchanging data with the remote resource in response to determining that the received software level at the server is not at the current level; and
  allowing the user to exchange data with the remote resource in response to determining that the received software level at the server is at the current level.

23. The method of claim 21, wherein the expected data comprises a requested amount of data from the server, wherein the received server information comprises a received amount of data, wherein determining whether the received server information satisfies the at least one security requirement comprises determining whether the received amount of data comprises the requested amount of data, further comprising:
  preventing a user from exchanging data with the remote resource in response to determining that the received amount of data comprises the requested amount of data; and
  allowing the user to exchange data with the remote resource in response to determining that the server did not return the requested amount of data.

24. The method of claim 21, wherein the remote resource comprises a web site providing access to a user account, further comprising:
  maintaining multiple security policies, wherein each security policy associates a web site type and a security action to perform, wherein the security action indicates to allow or deny a user to exchange data with the web site;
  determining a web site type in response to detecting the attempt to exchange data with the web site; and
  performing the security action indicated in the security policy associated with the determined web site type to determine whether to allow the access to the user account based on whether the received server information satisfies the at least one security requirement.

25. The method of claim 24, wherein the security policies each indicate the at least one computer instruction to execute, wherein at least two of the security policies indicate different computer instructions to execute to interact with the server.

26. The method of claim 25, wherein the security policies indicate computer instructions for different types of interactions to perform with respect to the server and multiple security requirements, one for each of the different types of interactions.

27. The method of claim 24, wherein for at least one security policy, the security action indicates to allow access to the user account in response to determining that one of the at least one interaction indicates that the server is exposed to a risk of attack.

28. The method of claim 24, wherein a first security policy is associated with a first web site type maintaining personal financial account information and wherein a second security policy is associated with a second web site type for which personal financial account information is not provided, wherein the at least one computer instruction comprises multiple operations to perform different tests with respect to the server, wherein a first security action associated with the first web site type specifies to prevent logging-in if one of the different tests performed with respect to the server indicates that the server is exposed to a risk, and wherein a second security action associated with the second web site type specifies to allow exchanging of data with the server if one of the different tests performed with respect to the server indicates that the server is exposed to the risk.

* * * * *